United States Patent
Taguchi et al.

(10) Patent No.: US 6,762,672 B2
(45) Date of Patent: Jul. 13, 2004

(54) THERMAL SENSOR

(75) Inventors: Motohisa Taguchi, Tokyo (JP); Masahiro Kawai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/700,637

(22) Filed: Nov. 5, 2003

(65) Prior Publication Data

US 2004/0090305 A1 May 13, 2004

(30) Foreign Application Priority Data

Nov. 6, 2002 (JP) ........................................ 2002-322230

(51) Int. Cl.$^7$ ................................................. H01C 3/04
(52) U.S. Cl. ........................................ 338/25; 374/185
(58) Field of Search ............................. 338/25; 374/185

(56) References Cited

U.S. PATENT DOCUMENTS

| | | | | |
|---|---|---|---|---|
| 5,006,421 A | * | 4/1991 | Yang et al. | .................. 428/641 |
| 5,798,684 A | * | 8/1998 | Endo et al. | ................ 338/22 R |
| 6,159,386 A | * | 12/2000 | Wienand et al. | ............... 216/16 |
| 6,184,773 B1 | * | 2/2001 | Bonne et al. | .................. 338/25 |
| 6,644,113 B2 | * | 11/2003 | Kawai et al. | ............. 73/204.26 |
| 6,701,782 B2 | * | 3/2004 | Iwaki et al. | .............. 73/204.26 |
| 2002/0183000 A1 | * | 12/2002 | Tang | .......................... 454/187 |

FOREIGN PATENT DOCUMENTS

| JP | 4-2967 A | 1/1992 |
|---|---|---|
| JP | 11-194043 A | 7/1999 |

* cited by examiner

*Primary Examiner*—Karl D. Easthom
(74) *Attorney, Agent, or Firm*—Sughrue Mion, PLLC

(57) ABSTRACT

A supporting film is formed over an entire front surface of a base material, a heating resistor composed of a platinum film having a predetermined pattern is formed on the supporting film, and a protecting film is formed over an entire surface of the supporting film so as to cover the heating resistor. A heating structure having a diaphragm construction is constructed by forming a cavity under a region where the heating resistor is formed by removing a portion of the base material so as to extend to the supporting film from the rear surface side of the base material. The supporting film and the protecting film are each constituted by a silicon nitride film having an index of refraction of less than 2.25.

10 Claims, 3 Drawing Sheets

THERMAL SENSOR

BACKGROUND OF THE INVENTION

1. Field of the Invention

The present invention relates to a thermal sensor and a heating structure used in the thermal sensor for detecting flow rate, acceleration, pressure, etc., and particularly to a thermal sensor and a heating structure used in the thermal sensor for use in applications such as thermal flow rate sensors in which extremely small changes in resistance are amplified and appear as output fluctuations.

2. Description of the Related Art

In a first conventional thermal flow rate sensor heating structure, a supporting film made of $Si_3N_4$ or $SiO_2$ is formed by coating over an entire surface of a silicon substrate, a heating resistor made of platinum is formed on the supporting film, and a protecting film made of $Si_3N_4$ or $SiO_2$ is further formed on the supporting film so as to cover the heating resistor. Then, a cavity is formed by removing the silicon substrate under the region where the heating resistor is disposed from a rear surface side until the supporting film is reached. Thus, a heating structure having a diaphragm construction composed of the supporting film, the heating resistor, and the protecting film is formed above the cavity. (Patent Literature 1, for example.)

In a second conventional thermal flow rate sensor heating structure, a supporting film and a protecting film constituting a diaphragm portion are formed such that a slight tensile stress arises relative to a silicon substrate. (Patent Literature 2, for example.)

Patent Literature 1: Japanese Patent Laid-Open No. HEI 4-2967 (Gazette, FIG. 1)

Patent Literature 2: Japanese Patent Laid-Open No HEI 11-194043 (Gazette, FIG. 2; paragraph 0012)

In the first conventional heating structure, if a material such as $SiO_2$, which tends to generate compressive stress, is used in the supporting film and the protecting film constituting the diaphragm portion, the diaphragm portion deforms due to thermal expansion when the heating resistor is generating heat. The larger the diaphragm portion, the greater the deformation of the diaphragm portion. Thus, heat dissipation characteristics from the diaphragm portion change, giving rise to irregularities in measurements.

In the second conventional heating structure, on the other hand, because the supporting film and the protecting film constituting the diaphragm portion are formed such that a slight tensile stress arises relative to the silicon substrate, deformation of the diaphragm portion due to the heat generated by the heating resistor can be suppressed. However, no mention has been made concerning a specific numerical value for the slight tensile stress, or the relationship between the size of the diaphragm portion and the tensile stress.

In view of these conditions, the present applicants have selected silicon nitride films for the supporting film and the protecting film constituting the diaphragm portion, and have found that silicon nitride ($Si_3N_4$) films having tensile stress can be stably formed by adjusting flow rates of argon, nitrogen, etc, and gas pressure inside a vacuum chamber, etc., in sputtering apparatuses, and by adjusting the flow ratio of material gases such as silanes, ammonia, etc., in plasma chemical vapor deposition (CVD) apparatuses, thereby leading to the invention of the present invention. It has been found that, depending on the manufacturing apparatus, it is necessary to use films rich in silicon (Si) relative to the stoichiometric composition ratio between Si and nitrogen (N) in an $Si_3N_4$ film in order to obtain silicon nitride films having tensile stress.

However, as described below, one problem has been that reliable output characteristics cannot be achieved in heating structures constituted by a heating resistor composed of a platinum film held between a supporting film and a protecting film formed using these silicon-rich silicon nitride films.

When consideration is given to fouling due to adsorption of moisture, it is preferable for the temperature conditions in which this heating structure is operated to be such that heat is generated at a temperature 100 degrees Celsius (100° C.) or more higher than the ambient atmospheric temperature, but under such temperature conditions, if heating is performed by continuously passing an electric current through the heating resistor of a heating structure constituted by a heating resistor composed of a platinum film held between a supporting film and a protecting film formed using these silicon-rich silicon nitride films, a phenomenon is observed in which the resistance value of the heating resistor after the heating due to the continuous passage of electric current changes relative to the resistance value before heating due to the continuous passage of electric current. The fluctuations in output characteristics occur as a result of the fluctuations in the resistance value of the heating resistor after the heating due to the continuous passage of electric current.

Furthermore, even if the supporting film and the protecting film constituting the heating structure have a slight tensile stress, if the tensile stress is too small when a rectangular diaphragm portion has a large size in which the length of the short sides thereof is 1 mm or more, the diaphragm portion expands when the heating resistor is generating heat, giving rise to bending. This bending, in other words deformation, of the diaphragm portion changes the heat dissipation characteristics of the diaphragm portion, giving rise to irregularities in output.

SUMMARY OF THE INVENTION

The present invention aims to solve the above problems and an object of the present invention is to provide a thermal sensor in which the reliability of output characteristics is high by reducing surplus silicon (Si) in a silicon nitride film to suppress silicidation of a heating resistor, which is a factor contributing to resistance value increases, and prescribing a magnitude for a tensile stress in the silicon nitride film to suppress deformation of a diaphragm portion occurring when the heating resistor is generating heat.

In order to achieve the above object, according to one aspect of the present invention, there is provided a thermal sensor including a flat base material through which an opening is disposed; and a heating structure having a diaphragm construction constructed by forming a supporting film on a first surface of the base material so as to cover the opening, forming a heating resistor composed of a platinum film on a portion of the supporting film above the opening, and forming a protecting film on the heating resistor. The thermal sensor is characterized in that at least one film of the supporting film and the protecting film is constituted by a silicon nitride film having an index of refraction of less than 2.25.

Therefore, silicidation of the platinum film resulting from heat generated by the heating resistor is suppressed, thereby providing a thermal sensor in which the reliability of output characteristics is high.

According to another aspect of the present invention, there is provided a thermal sensor including a flat base material through which an opening is disposed; and a heating structure having a diaphragm construction constructed by forming a supporting film on a first surface of the base material so as to cover the opening, forming a heating resistor composed of a platinum film on a portion of the supporting film above the opening, and forming a first protecting film on the supporting film so as to cover the heating resistor. The thermal sensor is characterized in that the supporting film and the first protecting film are each constituted by a silicon nitride film and the heating structure is constructed so as to have a tensile stress of greater than or equal to 50 MPa and less than or equal to 250 MPa.

Therefore, deformation of the diaphragm portion of the heating structure resulting from heat generated by the heating resistor is suppressed, thereby providing a thermal sensor in which the reliability of output characteristics is high.

According to yet another aspect of the present invention, there is provided a thermal sensor including a flat base material through which an opening is disposed; and a heating structure having a diaphragm construction constructed by forming a supporting film on a first surface of the base material so as to cover the opening, forming a heating resistor composed of a platinum film on a portion of the supporting film above the opening, forming a first protecting film on the heating resistor, forming an intermediate film on the supporting film so as to cover the first protecting film, and forming a second protecting film on the intermediate film. The thermal sensor is characterized in that the supporting film, the first protecting film, and the second protecting film are each constituted by a silicon nitride film, the heating structure is constructed so as to have a tensile stress of greater than or equal to 50 MPa and less than or equal to 250 MPa, and the intermediate film is formed to a film thickness of less than or equal to one tenth ($\frac{1}{10}$) of a sum of a film thickness of the supporting film and a film thickness of the second protecting film.

Therefore, deformation of the diaphragm construction of the heating structure resulting from heat generated by the heating resistor is suppressed and tolerance against deformation by external forces is increased, thereby providing a thermal sensor in which the reliability of output characteristics is high and durability is superior.

DETAILED DESCRIPTION OF THE PREFERRED EMBODIMENTS

Preferred embodiments of the present invention will now be explained with reference to the drawings.

Embodiment 1

Figure 1:
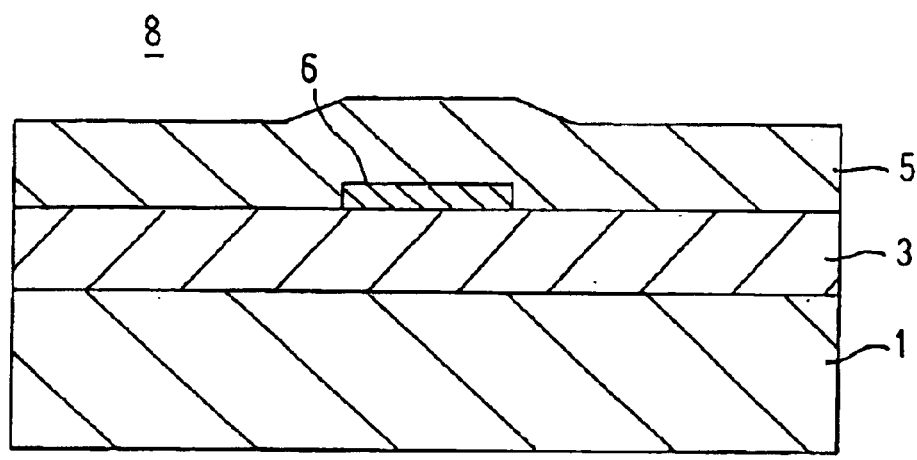
FIG. 1 is a cross section showing a heating structure according to Embodiment 1 of the present invention.

FIG. 1 is a cross section showing a heating structure according to Embodiment 1 of the present invention.

Moreover, in order to make the construction easier to see, FIG. 1 is not drawn to actual scale. This also applies to each of the figures below.

In FIG. 1, a heating structure 8 is constructed by: forming a backing film 3 functioning as a first electrically-insulating film composed of an alumina film over an entire surface of a base material 1 composed of a flat silicon substrate, forming a heating resistor 6 in which a platinum film constituting a thermosensitive resistance material is formed in a predetermined pattern on the backing film 3, and forming a protecting film 5 functioning as a second electrically-insulating film composed of a silicon nitride film on the backing film 3 so as to cover the heating resistor 6. The silicon nitride film constituting the protecting film 5 is formed so as to have an index of refraction of less than 2.25.

Next, a method for manufacturing the heating structure 8 will be explained.

First, the electrically-insulating backing film 3 is formed on the base material 1 by forming an alumina film to a thickness of 2.0 $\mu$m, for example, over an entire surface of the base material 1 using a method such as sputtering, etc. Next, a platinum film is formed to a thickness of 0.5 $\mu$m, for example, over an entire surface of the backing film 3 using a method such as vapor deposition, sputtering, etc. The base material 1 with the platinum film formed thereon is subjected to a heat treatment of 600 degrees Celsius to 750 degrees Celsius (600° C.–750° C.) in a vacuum. Next, the heating resistor 6 having the predetermined pattern is formed by patterning the platinum film using a method such as photoengraving, wet etching (or dry etching), etc. Finally, the electrically-insulating protecting film 5 is formed by forming a silicon nitride film to a thickness of 2.0 $\mu$m, for example, over an entire surface of the backing film 3 so as to cover the heating resistor 6 using a method such as sputtering, plasma chemical vapor deposition (CVD), etc., to obtain the heating structure 8.

Figure 5:
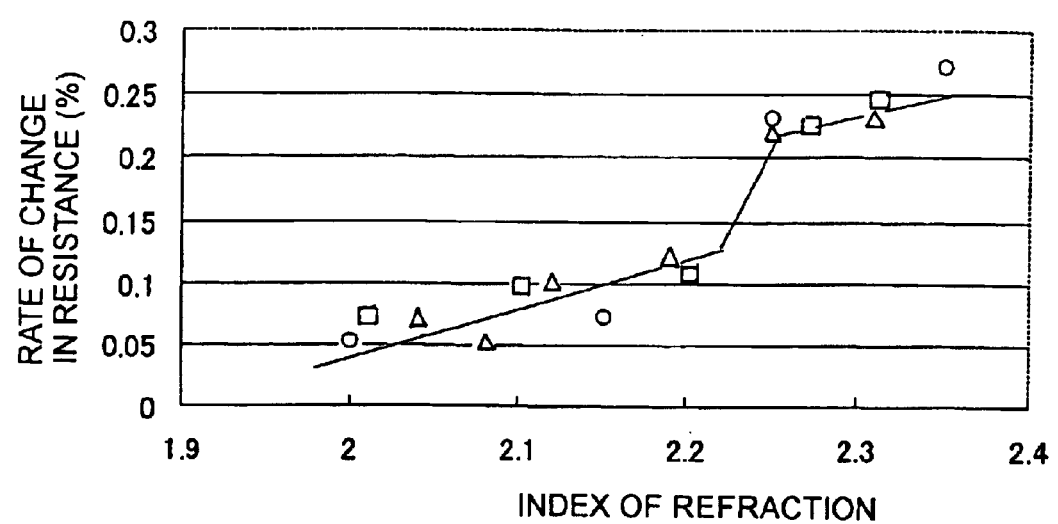
FIG. 5 is a graph showing a relationship between rate of change in resistance and index of refraction of a silicon nitride film in the present invention.

Next, heating structures 8 were prepared varying the index of refraction of the protecting film 5, an electric current was passed through the heating resistors 6 of the heating structures continuously for 500 hours at an ambient temperature of 130 degrees Celsius (130° C.) such that the heat-generated temperature of the heating resistors 6 was maintained at a temperature that was 120 degrees Celsius (120° C.) higher than the ambient temperature, that is at 250 degrees Celsius (250° C.), and the rates of change in resistance in the heating resistors 6 before and after the continuous passage of electric current were measured, the results being represented by circles in FIG. 5.

Moreover, in FIG. 5, the vertical axis represents the rate of change in resistance in the heating resistors before and after the continuous passage of electric current, and the horizontal axis representing the index of refraction in the protecting films. The rate of change in resistance is the percentage of {(resistance after the passage of electric current)–(resistance before the passage of electric current)} relative to the resistance value before the passage of electric current. The index of refraction of the protecting film 5 was measured with light having a wavelength of 830 nm. The index of refraction was changed by varying the elemental ratio between silicon (Si) and nitrogen (N) in the silicon nitride film constituting the protecting film 5.

From FIG. 5, it can be seen that the rate of change in resistance increases as the index of refraction in the protecting film 5 increases. When the index of refraction in the protecting film 5 is less than 2.25, the rate of change in resistance is stable at less than or equal to 0.15 percent (0.15%), but when the index of refraction exceeds 2.25, the rate of change in resistance rapidly increases to greater than or equal to 0.20 percent (0.20%).

This is because when the index of refraction is greater than or equal to 2.25, surplus silicon (Si) in the silicon nitride film becomes excessive and excessive surplus Si promotes silicidation of the platinum film constituting the heating resistor 6 while the heating resistor 6 is generating heat, increasing resistance fluctuations in the heating resistor 6. Thus, when the index of refraction is less than 2.25, the Si ratio in the silicon nitride film can be considered to be optimized, reducing surplus Si and thus reducing the promotion of silicidation by the surplus Si in the platinum film constituting the heating resistor 6, thereby suppressing resistance fluctuations in the heating resistor 6.

When the rate of change in resistance in the heating resistor 6 is greater than or equal to 0.20%, if attempts are made to increase the amplification factor of output under conditions where sensitivity is hard to achieve, output characteristics are affected.

However, in Embodiment 1, because the index of refraction of the protecting film 5, which is constituted by a silicon nitride film, is less than 2.25, reducing the rate of change in resistance in the heating resistor 6 resulting from silicidation of the platinum film, output characteristic fluctuations are reduced even under severe service conditions, thereby providing a stable, highly-reliable heating structure 8.

Now, when measuring the flow rate of intake air in an internal combustion engine of an automobile, the passage of electric current through the heating resistor 6 is controlled such that the heat-generated temperature in the heating resistor 6 is maintained at a temperature 100 degrees Celsius (100° C.) or more higher than the ambient temperature under severe conditions where the ambient temperature is 130 degrees Celsius (130° C.). And under conditions where sensitivity is hard to achieve, the amplification factor of the output must increased.

Consequently, if a heating structure 8 in which the index of refraction in the protecting film 5 constituted by the silicon nitride film is less than 2.25 is applied to the measurement of the flow rate of intake air in the internal combustion engine of an automobile, because changes in the resistance values of the heating resistor 6 are reduced under severe service conditions, output characteristic fluctuations are reduced, enabling the flow rate of intake air to be detected stably and reliably.

In Embodiment 1, the heating resistor 6 (the platinum film) is heat-treated in a vacuum.

If the heat treatment temperature is less than 600 degrees Celsius (600° C.), the temperature coefficient of resistance (TCR) of the platinum film is less than 2800 parts per million per degree Celsius (2800 ppm/° C.), increasing the ratio of output characteristic fluctuations to resistance fluctuations in the platinum film. If the heat treatment temperature exceeds 750 degrees Celsius (750° C.), silicidation of the platinum film is promoted by surplus Si in the silicon nitride film while the heating resistor 6 is generating heat, increasing the rate of change in resistance in the heating resistor 6. Thus, it is desirable for the heat treatment temperature of the platinum film to be 600 degrees Celsius to 750 degrees Celsius (600° C.–750° C.). By heat-treating the platinum film at 600° C.–750° C.), the temperature coefficient of resistance (TCR) of the platinum film can be increased to between 2800 ppm/° C. and 3300 ppm/° C.

Thus, in Embodiment 1, because the heating resistor 6 (the platinum film) is heat-treated at a temperature of 600° C. to 750° C. in a vacuum, the rate of change in resistance in the heating resistor 6 resulting from silicidation of the platinum film can be reduced, increasing the temperature coefficient of resistance (TCR) of the platinum film to between 2800 ppm/° C. and 3300 ppm/° C., thereby enabling the ratio of output characteristic fluctuations to resistance fluctuations in the platinum film to be made comparatively low.

Moreover, in Embodiment 1 above, an alumina film is used for the backing film 3, but a silicon oxide film such as a thermal oxidation film ($SiO_2$), a phosphosilicate glass (PSG) film, etc., or a silicon nitride film may also be used for the backing film. If a silicon nitride film is used for the backing film, the index of refraction of the silicon nitride film should be less than 2.25.

In Embodiment 1 above, a silicon substrate is explained as being used for the base material 1, but the material of the base material 1 is not particularly specified and for example, an alumina substrate or a glass substrate may also be used. If the base material 1 is prepared using an alumina substrate, the backing film 3 may also be omitted and the heating resistor 6 and the protecting film 5 formed directly on the base material 1.

In Embodiment 1 above, the protecting film 5 is formed on the backing film 3 so as to cover the heating resistor 6, but the protecting film 5 may also be formed so as to cover only an upper surface of the heating resistor 6, a separate protecting film then being formed so as to cover the protecting film 5 and the heating resistor 6.

Embodiment 2

Figure 2:
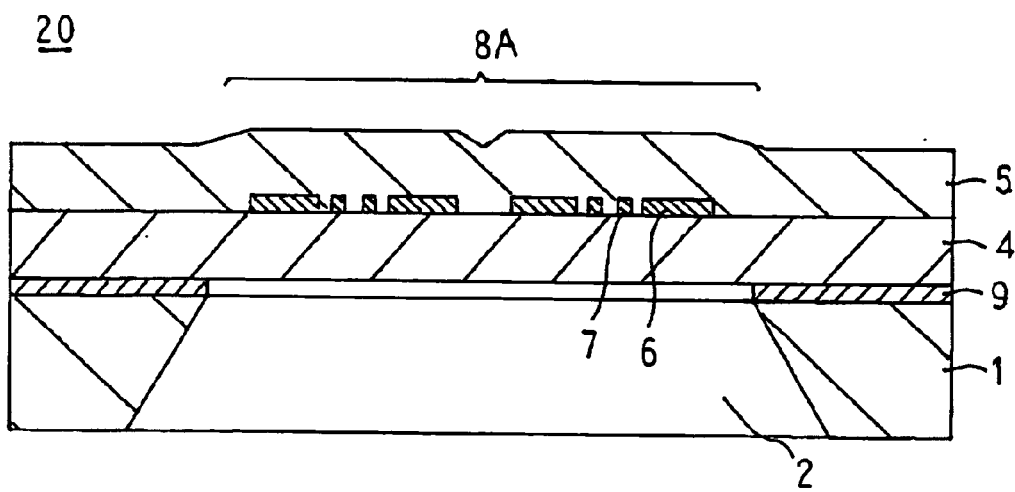
FIG. 2 is a cross section explaining a construction of a heating structure of a thermal sensor according to Embodiment 2 of the present invention.
Figure 3:
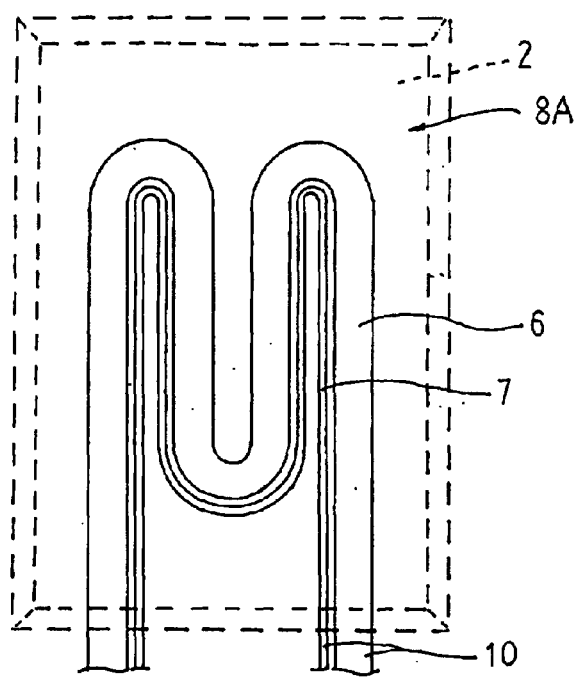
FIG. 3 is a plan showing a vicinity of the heating structure of the thermal sensor according to Embodiment 2 of the present invention.

FIG. 2 is a cross section explaining a construction of a heating structure of a thermal sensor according to Embodiment 2 of the present invention, and FIG. 3 is a plan showing a vicinity of the heating structure of the thermal sensor according to Embodiment 2 of the present invention. Moreover, FIG. 3 shows a state in which the protecting film 5 has been removed.

In FIGS. 2 and 3, a thermal sensor 20 is provided with: a flat base material 1 through which a cavity 2 functioning as an opening is disposed; and a heating structure 8A having a diaphragm portion (a diaphragm construction) formed so as to cover the cavity 2 on a front surface (a first surface) of the base material 1.

The base material 1 is a flat silicon substrate, the entire front surface thereof being covered by a base material protecting film 9 such as a thermal oxidation film, etc. The cavity 2 is formed by removing a portion of the base material 1 and the base material protecting film 9 from a rear surface (a second surface) side of the base material 1.

The heating structure 8A is constructed by: forming an electrically-insulating supporting film 4 composed of a silicon nitride film on the front surface of the base material 1 so as to cover the cavity 2, forming a heating resistor 6 and a thermosensitive resistor 7 composed of a platinum film on a portion of the supporting film 4 above the cavity 2, and forming an electrically-insulating protecting film 5 composed of a silicon nitride film on the supporting film 4 so as to cover the heating resistor 6 and the thermosensitive resistor 7. The silicon nitride films constituting the supporting film 4 and the protecting film 5 are each formed so as to have an index of refraction of less than 2.25.

Next, a method for manufacturing the thermal sensor 20 will be explained.

First, the electrically-insulating supporting film 4 is formed on the base material 1 by forming a silicon nitride film to a thickness of 2.0 μm, for example, over an entire surface of the base material protecting film 9 on the base material 1 using a method such as sputtering, plasma CVD, etc. Next, a platinum film is formed to a thickness of 0.2 μm, for example, over an entire surface of the supporting film 4 using a method such as vapor deposition, sputtering, etc. The base material 1 with the platinum film formed thereon is subjected to a heat treatment of 600 degrees Celsius to 750 degrees Celsius (600° C.–750° C.) in a vacuum. Next, the heating resistor 6, the thermosensitive resistor 7, and electric current paths 10 having a predetermined pattern are formed by patterning the platinum film using a method such as photoengraving, wet etching (or dry etching), etc. Finally, the electrically-insulating protecting film 5 is formed by forming a silicon nitride film to a thickness of 3.0 μm, for example, over an entire surface of the supporting film 4 so as to cover the heating resistor 6, the thermosensitive resistor 7, and the electric current paths 10 using a method such as sputtering, plasma CVD, etc.

Next, a rear surface protecting film (not shown) is formed by applying a resist to the entire rear surface of the base material 1. Then, an etching aperture (not shown) is formed by removing a portion of the rear surface protecting film using photoengraving, etc. Thereafter, the cavity 2 is formed by removing portions of the base material 1 and the base material protecting film 9 so as to extend to the supporting film 4 from the rear surface side of the base material 1 by applying alkali etching, for example. The cavity 2 is formed so as to be below a region where the heating resistor 6 and the thermosensitive resistor 7 are formed. Thus, the heating structure 8A having a diaphragm construction is constructed by forming the heating resistor 6 and the thermosensitive resistor 7 above the cavity 2 so as to be supported by the supporting film 4 and forming the protecting film 5 on the supporting film 4 so as to cover the heating resistor 6 and the thermosensitive resistor 7.

Here, KOH, tetramethyl ammonium hydroxide (TMAH), NaOH, etc., may be used as the etchant.

The thermal sensor 20 according to Embodiment 2 is provided with a heating structure 8A having a diaphragm portion formed on the front surface of the base material 1 so as to cover the cavity 2 on the front surface side of the base material 1. This heating structure 8A having a diaphragm portion has a 1.5 mm×4.0 mm rectangular shape, the heating resistor 6 and the thermosensitive resistor 7 being formed to size of 0.8 mm×2.0 mm on a central portion of the heating structure 8A. The thermosensitive resistor 7 of the thermal sensor 20 functions as a resistance thermometer component for detecting the temperature of the heating resistor 6.

Next, thermal sensors 20 having heating structures 8A were prepared with the index of refraction of the supporting film 4 fixed to 2.00 while varying the index of refraction of the protecting film 5, an electric current was passed through the heating resistors 6 of the heating structures 8A continuously for 200 hours at an ambient temperature of 130 degrees Celsius (130° C.) such that the heat-generated temperature of the heating resistors 6 was maintained at a temperature that was 120 degrees Celsius (120° C.) higher than the ambient temperature, that is at 250 degrees Celsius (250° C), and the rates of change in resistance in the heating resistors 6 before and after the continuous passage of electric current were measured, the results being represented by triangles in FIG. 5.

Moreover, the indexes of refraction of the supporting film 4 and of the protecting film 5 were measured with light having a wavelength of 830 nm. The index of refraction was changed by varying the elemental ratio between silicon (Si) and nitrogen (N) in the silicon nitride film constituting the protecting film 5.

From FIG. 5, it can be seen that the rate of change in resistance increases as the index of refraction in the protecting film 5 increases. When the index of refraction in the protecting film 5 is less than 2.25, the rate of change in resistance is stable at less than or equal to 0.15 percent (0.15%), but when the index of refraction exceeds 2.25, the rate of change in resistance rapidly increases to greater than or equal to 0.20 percent (0.20%).

Consequently, in Embodiment 2, by making the indexes of refraction of the supporting film 4 and of the protecting film 5, which are each constituted by a silicon nitride film, less than 2.25, the rate of change in resistance in the heating resistor 6 resulting from silicidation of the platinum film when the heating resistor 6 is generating heat can also be reduced, and output characteristic fluctuations are reduced even under severe service conditions such as in measurement of the flow rate of intake air in the internal combustion engine of an automobile, thereby providing a stable, highly-reliable thermal sensor 20.

Moreover, when a thermal sensor in which the index of refraction of the protecting film 5 was greater than or equal to 2.25 was applied to measurement of the flow rate of intake air in the internal combustion engine of an automobile, results were obtained showing it to be outside drift specifications requiring the flow rate conversion output to be within ±3% in a low flow rate region where sensitivity is difficult to achieve.

In Embodiment 2, because the heating resistor 6 (the platinum film) is also heat-treated at a temperature of 600° C. to 750° C. in a vacuum, the rate of change in resistance in the heating resistor 6 resulting from silicidation of the platinum film can be reduced, and the ratio of output characteristic fluctuations to resistance fluctuations in the platinum film can be made comparatively low.

In Embodiment 2, because the supporting film 4 and the protecting film 5 are each formed by a silicon nitride film which is silicon-rich compared to the stoichiometric composition ratio of an $Si_3N_4$ film, the supporting film 4 and the protecting film 5 can be formed easily so as to have a tensile stress relative to the base material 1, enabling suppression of irregularities in output accompanying the deformation of the diaphragm portion of the heating structure 8A by thermal expansion when the heating resistor 6 is generating heat.

Now, in Embodiment 2 above, the silicon nitride films are formed by a method such as sputtering, plasma CVD, etc., and in sputtering film formation methods, the composition ratio between Si and N can be adjusted by controlling flow rate of argon (Ar) and nitrogen ($N_2$), etc., gas pressure inside a vacuum chamber, etc. Consequently, in sputtering film formation methods, the control parameters are reduced compared to plasma CVD film formation methods, and the use of dangerous gases such as silane gases, etc., is eliminated, making sputtering film formation methods particularly effective for formation of the silicon nitride films.

Moreover, in Embodiment 2 above, the heating resistor 6 and the thermosensitive resistor 7 are both formed within the heating structure 8A, but the heating resistor 6 may also be formed in the heating structure 8A on its own. A plurality of heating resistors 6 and thermosensitive resistors 7 may also be formed in the heating structure 8A.

In Embodiment 2 above, a silicon nitride film is used for the supporting film 4, but similar effects can also be achieved if a silicon oxide film (a thermal oxidation film, PSG film, etc.) is used as a supporting film. In that case, because silicon oxide films participate very little in silicidation of the platinum film compared to silicon nitride films, only the index of refraction of the protecting film 5 composed of the silicon nitride film needs to be adjusted to less than 2.25.

Embodiment 3

In Embodiment 2, silicon nitride films are formed such that the indexes of refraction of the supporting film 4 and the protecting film 5 are less than 2.25, but in Embodiment 3, silicon nitride films are formed such that the supporting film 4 and the protecting film 5 each have a tensile stress of greater than or equal to 50 MPa and less than or equal to 250 MPa relative to the base material 1.

Moreover, the rest of this embodiment is constructed in a similar manner to Embodiment 2 above.

In Embodiment 3, a heating structure has a diaphragm portion (a diaphragm construction) in which a heating resistor 6 and a thermosensitive resistor 7 are held between a supporting film 4 and a protecting film 5, in a similar manner to Embodiment 2 above. In this diaphragm portion, the diaphragm portion is deformed by thermal expansion due to the generation of heat by the heating resistor 6. The deformation of the diaphragm portion changes the heat dissipation characteristics of the diaphragm portion, giving rise to irregularities in output. Thus, it is important to suppress the deformation of the diaphragm portion from the viewpoint of the reliability of the output characteristics.

The relationship in this diaphragm portion between stresses in the diaphragm portion relative to the base material 1 and the deformation of the diaphragm portion by the heat generated in the heating resistor 6 will now be investigated.

First, when the supporting film 4 and the protecting film 5 constituting the diaphragm portion have a compressive stress relative to the base material 1, the diaphragm portion is deformed greatly by thermal expansion due to the generation of heat by the heating resistor 6.

When the supporting film 4 and the protecting film 5 have a tensile stress relative to the base material 1, the deformation of the diaphragm portion resulting from the heat generated in the heating resistor 6 is reduced.

However, in the case of rectangular diaphragm portions in which the short sides exceed 1 mm, if the tensile stress of the supporting film 4 and the protecting film 5 constituting the diaphragm portion is less than 50 MPa, the deformation of the diaphragm portion resulting from the heat generated in the heating resistor 6 cannot be reduced sufficiently.

Consequently, to increase the reliability of the output characteristics, it is desirable for the tensile stress in the supporting film 4 and the protecting film 5 constituting the diaphragm portion to be greater than or equal to 50 MPa.

If the tensile stress of the supporting film 4 and the protecting film 5 constituting the diaphragm portion exceeds 250 MPa, significantly large buckling may occur in the base material 1 during manufacture of the thermal sensor 20, giving rise to chucking errors, cracking of the base material 1, etc., during transportation of the thermal sensor 20. Thus, in order to suppress the buckling of the base material 1 during manufacture, it is desirable for the tensile stress in the supporting film 4 and the protecting film 5 constituting the diaphragm portion to be less than or equal to 250 MPa.

According to Embodiment 3, because the silicon nitride films constituting the supporting film 4 and the protecting film 5 are formed using a film formation method such as sputtering, plasma CVD, etc., so as to have a tensile stress of greater than or equal to 50 MPa and less than or equal to 250 MPa relative to the base material 1 by controlling film formation conditions, irregularities in output resulting from the deformation of the diaphragm portion of the heating structure due to the generation of heat by the heating resistor 6 are reduced, improving the reliability of detection characteristics, and buckling occurring in the base material 1 during manufacture of the thermal sensor is reduced, enabling the occurrence of chucking errors, cracking of the base material 1, etc., during transportation of the thermal sensor to be suppressed.

Thus, even if this thermal sensor is applied to the measurement of the flow rate of intake air in the internal combustion engine of an automobile, output characteristic fluctuations are reduced, enabling the flow rate of the intake air to be measured stably and reliably.

Because the supporting film 4 and the protecting film 5 of the thermal sensor constructed in this manner have a tensile stress of greater than or equal to 50 MPa and less than or equal to 250 MPa, they also have a force of recovery from large deformations due to external forces, making them superior in mechanical strength. Thus, even if this thermal sensor is applied to the measurement of the flow rate of intake air in the internal combustion engine of an automobile, problems of cracking due to impact by dust can be avoided.

Moreover, in Embodiment 3, the silicon nitride films in the supporting film 4 and the protecting film 5 may also be formed so as to have a tensile stress of greater than or equal to 50 MPa and less than or equal to 250 MPa relative to the base material 1 and to have an index of refraction of less than 2.25. In that case, deformation of the diaphragm portion of the heating structure resulting from thermal expansion due to the generation of heat by the heating resistor 6 can be reduced, and the rate of change in the resistance of the heating resistor 6 resulting from silicidation of the platinum film when heat is being generated by the heating resistor 6 can also be reduced.

Embodiment 4

Figure 4:
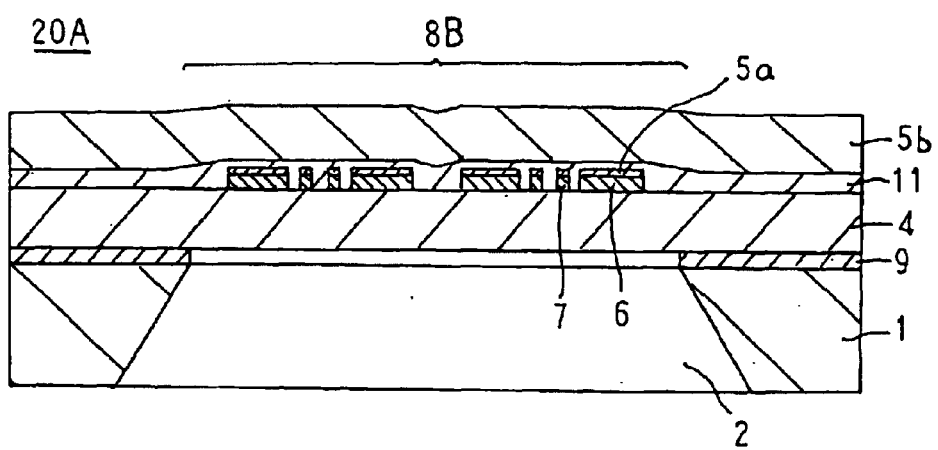
FIG. 4 is a cross section explaining a construction of a heating structure of a thermal sensor according to Embodiment 4 of the present invention.

FIG. 4 is a cross section explaining a construction of a heating structure of a thermal sensor according to Embodiment 4 of the present invention.

In FIG. 4, a thermal sensor 20A is provided with: a flat base material 1 through which a cavity 2 functioning as an opening is disposed; and a heating structure 8B having a diaphragm portion (a diaphragm construction) formed so as to cover the cavity 2 on a front surface (a first surface) of the base material 1.

The base material 1 is a flat silicon substrate, the entire front surface thereof being covered by a base material protecting film 9 such as a thermal oxidation film, etc. The cavity 2 is formed by removing a portion of the base material 1 and the base material protecting film 9 from a rear surface (a second surface) side of the base material 1.

The heating structure 8B is constructed by: forming an electrically-insulating supporting film 4 composed of a silicon nitride film on the front surface of the base material 1 so as to cover the cavity 2, forming a heating resistor 6 and a thermosensitive resistor 7 composed of a platinum film on a portion of the supporting film 4 above the cavity 2, forming a first protecting film 5a composed of a silicon nitride film on the heating resistor 6 and the thermosensitive resistor 7 so as to be formed into a pattern identical to that of the heating resistor 6 and the thermosensitive resistor 7, coating an intermediate film 11 onto the supporting film 4 so as to cover the first protecting film 5a, the heating resistor 6, and the thermosensitive resistor 7, and forming an electrically-insulating second protecting film 5b composed of a silicon nitride film on the intermediate film 11. The silicon nitride films constituting the supporting film 4 and the first protecting film 5a are each formed so as to have an index of refraction of less than 2.25.

Next, a method for manufacturing the thermal sensor 20A will be explained.

First, the electrically-insulating supporting film 4 is formed on the base material 1 by forming a silicon nitride film to a thickness of 2.0 μm, for example, over an entire surface of the base material protecting film 9 of the base material 1 using a method such as sputtering, plasma CVD, etc. Next, a platinum film is formed to a thickness of 0.2 μm, for example, over an entire surface of the supporting film 4 using a method such as vapor deposition, sputtering, etc. In addition, a silicon nitride film is formed to a thickness of 0.2 μm, for example, over the entire surface of the platinum film using a method such as sputtering, the plasma CVD, etc. The base material 1 with the platinum film and the silicon nitride film formed thereon are subjected to a heat treatment of 600 degrees Celsius to 750 degrees Celsius (600° C.–750° C.) in a vacuum. Next, the heating resistor 6, the thermosensitive resistor 7, and electric current paths (not shown) having a predetermined pattern are formed by patterning the platinum film and the silicon nitride film using a method such as photoengraving, wet etching (or dry etching), etc. Thus, the first protecting film 5a composed of the silicon nitride film having a thickness of 0.2 μm is formed only on the heating resistor 6, the thermosensitive resistor 7, and the electric current paths.

Next, a spin-on glass (SOG) film (an applied silicon oxide film) is formed to a thickness of 0.2 μm, for example, over an entire surface of the supporting film 4 so as to cover the heating resistor 6, the thermosensitive resistor 7, and the electric current paths on which the first protecting film 5a is coated to obtain the intermediate film 11. Finally, the second protecting film 5b is formed by forming a silicon nitride film to a thickness of 3.0 μm, for example, over an entire surface of the intermediate film 11 using a method such as sputtering, plasma CVD, etc.

Next, a rear-surface protecting film (not shown) is formed by applying a resist to the entire rear surface of the base material 1. Then, an etching aperture (not shown) is formed by removing a portion of the rear-surface protecting film using photoengraving, etc. Thereafter, the cavity 2 is formed by removing portions of the base material 1 and the base material protecting film 9 so as to extend to the supporting film 4 from the rear surface side of the base material 1 by applying alkali etching, for example. The cavity 2 is formed so as to be below a region where the heating resistor 6 and the thermosensitive resistor 7 are formed. Thus, the heating structure 8B having a diaphragm construction is constructed by forming the heating resistor 6 and the thermosensitive resistor 7 above the cavity 2 so as to be supported by the supporting film 4, coating the first protecting film 5a on the heating resistor 6 and the thermosensitive resistor 7, forming the intermediate film 11 on the supporting film 4 so as to cover the heating resistor 6 and the thermosensitive resistor 7 coated with the first protecting film 5a, and coating the second protecting film 5b over the entire surface of the intermediate film 11.

Here, KOH, tetramethyl ammonium hydroxide (TMAH), NaOH, etc., may be used as the etchant.

The thermal sensor 20A according to Embodiment 4 is provided with a heating structure 8B having a diaphragm portion formed on the front surface of the base material 1 so as to cover the cavity 2 on the front surface side of the base material 1. This heating structure 8B having a diaphragm portion has a 1.5 mm×4.0 mm rectangular shape, the heating resistor 6 and the thermosensitive resistor 7 being formed to size of 0.8 mm×2.0 mm on a central portion of the heating structure 8B. The thermosensitive resistor 7 of the thermal sensor 20A functions as a resistance thermometer component for detecting the temperature of the heating resistor 6.

Next, thermal sensors 20A having heating structures 8B were prepared with the index of refraction of the supporting film 4 fixed to 2.00 while varying the index of refraction of the first protecting film 5a, an electric current was passed through the heating resistors 6 of the heating structures 8B continuously for 200 hours at an ambient temperature of 130 degrees Celsius (130° C.) such that the heat-generated temperature of the heating resistors 6 was maintained at a temperature that was 120 degrees Celsius (120° C.) higher than the ambient temperature, that is at 250 degrees Celsius (250° C.), and the rates of change in resistance in the heating resistors 6 before and after the continuous passage of electric current were measured, the results being represented by squares in FIG. 5.

Moreover, the indexes of refraction of the supporting film 4 and of the first protecting film 5a were measured with light having a wavelength of 830 nm. The index of refraction was changed by varying the elemental ratio between silicon (Si) and nitrogen (N) in the silicon nitride film constituting the first protecting film 5a.

From FIG. 5, it can be seen that the rate of change in resistance increases as the index of refraction in the first protecting film 5a increases. When the index of refraction in the first protecting film 5a is less than 2.25, the rate of change in resistance is stable at less than or equal to 0.15 percent (0.15%), but when the index of refraction exceeds 2.25, the rate of change in resistance rapidly increases to greater than or equal to 0.20 percent (0.20%).

Consequently, in Embodiment 4, by making the indexes of refraction of the supporting film 4 and of the first protecting film 5a, which are each constituted by a silicon nitride film, less than 2.25, the rate of change in resistance in the heating resistor 6 resulting from silicidation of the platinum film when the heating resistor 6 is generating heat can also be reduced, output characteristic fluctuations are reduced even under severe service conditions such as in the measurement of the flow rate of intake air in the internal combustion engine of an automobile, thereby providing a stable, highly-reliable thermal sensor 20A.

Moreover, when a thermal sensor in which the index of refraction of the first protecting film 5a was greater than or equal to 2.25 was applied to measurement of the flow rate of intake air in the internal combustion engine of an automobile, results were obtained showing it to be outside drift specifications requiring the flow rate conversion output to be within ±3% in a low flow rate region where sensitivity is difficult to achieve.

In Embodiment 4, because the supporting film 4, the first protecting film 5a, and the second protecting film 5b are each formed by a silicon nitride film which is silicon-rich compared to the stoichiometric composition ratio of an $Si_3N_4$ film, the supporting film 4, the first protecting film 5a, and the second protecting film 5b can also be formed easily so as to have a tensile stress relative to the base material 1, enabling suppression of irregularities in output accompanying the deformation of the diaphragm portion of the heating structure 8B when the heating resistor 6 is generating heat.

In the thermal sensor 20A according to Embodiment 4, an SOG film intermediate film 11 is formed. This SOG film contains silicon (Si) and oxygen (O) as major constituents and has extremely high fluidity. Thus, sharp differences in level (stepped portions) formed between the heating resistor 6, the thermosensitive resistor 7, the first protecting film 5a, etc., and the supporting film 4 are smoothed by forming the intermediate film 11 composed of this SOG film. As a result, coatability of the second protecting film 5b onto the stepped portions between the heating resistor 6, the thermosensitive resistor 7, the first protecting film 5a, etc., and the supporting film 4 is improved significantly, preventing the occurrence of cracking of the second protecting film 5b at the stepped portions even if the heating structure 8B is deformed by external forces. In other words, tolerance against deformation by external forces is increased. In addition, if this thermal sensor is applied to the measurement of the flow rate of intake air in the internal combustion engine of the automobile, penetration by ambient moisture, fuel, etc., is prevented, suppressing corrosion, and the occurrence of cracking, etc., thereby improving reliability.

In Embodiment 4, because the heating resistor 6 (the platinum film) is also heat-treated at a temperature of 600° C. to 750° C. in a vacuum, silicidation of the platinum film by surplus Si in the silicon nitride film while the heating resistor 6 is generating heat is reduced, reducing the rate of change in resistance in the heating resistor 6. Furthermore, because the temperature coefficient of resistance of the platinum film can be raised to between 2800 ppm/° C. and 3300 ppm/° C. by heat-treating the platinum film, the ratio of output characteristic fluctuations to resistance fluctuations in the platinum film can be made comparatively low.

Moreover, in Embodiment 4 above, the heating resistor 6 and the thermosensitive resistor 7 are both formed within the heating structure 8B, but the heating resistor 6 may also be formed in the heating structure 8B on its own. A plurality of heating resistors 6 and thermosensitive resistors 7 may also be formed in the heating structure 8B.

In Embodiment 4 above, a silicon nitride film is used for the supporting film 4, but similar effects can also be achieved if a silicon oxide film (a thermal oxidation film, PSG film, etc.) is used as a supporting film. In that case, because silicon oxide films participate very little in silicidation of the platinum film compared to silicon nitride films, only the index of refraction of the first protecting film 5a composed of the silicon nitride film contacting the heating resistor 6 needs to be adjusted to less than 2.25.

Embodiment 5

In Embodiment 4, silicon nitride films are formed such that the indexes of refraction of the supporting film 4 and the first protecting film 5a are less than 2.25, but in Embodiment 5, silicon nitride films are formed such that the supporting film 4 and the second protecting film 5b each have a tensile stress of greater than or equal to 50 MPa and less than or equal to 250 MPa relative to the base material 1.

Moreover, the rest of this embodiment is constructed in a similar manner to Embodiment 4 above.

Consequently, according to Embodiment 5, because the silicon nitride films constituting the supporting film 4 and the second protecting film 5b of a heating structure are formed using a film formation method such as sputtering, plasma CVD, etc., so as to have a tensile stress of greater than or equal to 50 MPa and less than or equal to 250 MPa relative to the base material 1 by controlling film formation conditions, deformation of a diaphragm portion (a diaphragm construction) of the heating structure due to the generation of heat by the heating resistor 6 is suppressed in a similar manner to Embodiment 3 above, reducing irregularities in output resulting from the deformation of the diaphragm portion of the heating structure due to the generation of heat by the heating resistor 6 and improving the reliability of detection characteristics. Because this thermal sensor also has a force of recovery from large deformations due to external forces, making the thermal sensor superior in mechanical strength, even if the thermal sensor is applied to the measurement of the flow rate of intake air in the internal combustion engine of an automobile, problems of cracking due to impact by dust can be avoided.

Because the stresses in the SOG film itself are extremely small, the film thickness of the intermediate film 11 need only be set to less than or equal to $\frac{1}{10}$ of a sum of a film thickness of the supporting film 4 and a film thickness of the second protecting film 5b to be effective without causing any change in the tensile stress of the silicon nitride films of the supporting film 4 and the second protecting film 5b.

Moreover, in Embodiment 5, the silicon nitride films in the supporting film 4 and the second protecting film 5b may also be formed so as to have a tensile stress of greater than or equal to 50 MPa and less than or equal to 250 MPa relative to the base material 1, and the supporting film 4 and the first protecting film 5a to have an index of refraction of less than 2.25. In that case, deformation of the diaphragm portion of the heating structure resulting from thermal expansion due to the generation of heat by the heating resistor 6 can be reduced, and the rate of change in the resistance of the heating resistor 6 resulting from silicidation of the platinum film when heat is being generated by the heating resistor 6 can also be reduced.

In Embodiments 2 to 5 above, a silicon substrate is explained as being used for the base material 1, but the material of the base material 1 is not particularly specified and for example, an alumina substrate or a glass substrate may also be used.

What is claimed is:

1. A thermal sensor comprising:

a flat base material through which an opening is disposed; and a heating structure having a diaphragm construction constructed by forming a supporting film on a first surface of said base material so as to cover said opening, forming a heating resistor composed of a platinum film on a portion of said supporting film above said opening, and forming a protecting film on said heating resistor, wherein:

at least one film of said supporting film and said protecting film is constituted by a silicon nitride film having an index of refraction of less than 2.25.

2. The thermal sensor according to claim 1, wherein:

said heating resistor is heat-treated at a temperature of greater than or equal to 600° C. and less than or equal to 750° C.

3. The thermal sensor according to claim 1, wherein:

said silicon nitride film is formed into a film which is rich in silicon compared to a stoichiometric composition ratio of an $Si_3N_4$ film.

4. A thermal sensor comprising:

a flat base material through which an opening is disposed; and a heating structure having a diaphragm construction constructed by forming a supporting film on a first surface of said base material so as to cover said opening, forming a heating resistor composed of a platinum film on a portion of said supporting film above said opening, and forming a protecting film on said supporting film so as to cover said heating resistor, wherein:

said supporting film and said protecting film are each constituted by a silicon nitride film; and said heating structure is constructed so as to have a tensile stress of greater than or equal to 50 MPa and less than or equal to 250 MPa.

5. The thermal sensor according to claim 4, wherein:

said heating resistor is heat-treated at a temperature of greater than or equal to 600° C. and less than or equal to 750° C.

6. The thermal sensor according to claim 4, wherein:

said silicon nitride film is formed into a film which is rich in silicon compared to a stoichiometric composition ratio of an $Si_3N_4$ film.

7. A thermal sensor comprising:

a flat base material through which an opening is disposed; and a heating structure having a diaphragm construction constructed by forming a supporting film on a first surface of said base material so as to cover said opening, forming a heating resistor composed of a platinum film on a portion of said supporting film above said opening, forming a first protecting film on said heating resistor, forming an intermediate film on said supporting film so as to cover said first protecting film, and forming a second protecting film on said intermediate film, wherein:

said supporting film, said first protecting film, and said second protecting film are each constituted by a silicon nitride film;

said heating structure is constructed so as to have a tensile stress of greater than or equal to 50 MPa and less than or equal to 250 MPa; and said intermediate film is formed to a film thickness of less than or equal to one tenth (1/10) of a sum of a film thickness of said supporting film adn a film hickness of said second protecting film.

8. The thermal sensor according to claim 7, wherein:

said heating resistor is heat-treated at a temperature of greater than or equal to 600° C. and less than or equal to 750° C.

9. The thermal sensor according to claim 7, wherein:

said silicon nitride film is formed into a film which is rich in silicon compared to a stoichiometric composition ratio of an $Si_3N_4$ film.

10. The thermal sensor according to claim 7, wherein:

said intermediate film is a spin-on glass (SOG) film.

* * * * *